(12) United States Patent
Gao et al.

(10) Patent No.: US 6,917,749 B2
(45) Date of Patent: Jul. 12, 2005

(54) POLYMER OPTICAL WAVEGUIDES ON POLYMER SUBSTRATES

(75) Inventors: Renyuan Gao, Downingtown, PA (US); Donald S. Bitting, Reading, PA (US); Robert M. Mininni, New Hope, PA (US); Robert A. Norwood, West Chester, PA (US); Kazuya Takayama, Fukushima (JP); Anthony F. Garito, Radnor, PA (US)

(73) Assignee: Photon-X, LLC, Malvern, PA (US)

( * ) Notice: Subject to any disclaimer, the term of this patent is extended or adjusted under 35 U.S.C. 154(b) by 407 days.

(21) Appl. No.: 10/045,317

(22) Filed: Nov. 7, 2001

(65) Prior Publication Data

US 2003/0086679 A1 May 8, 2003

(51) Int. Cl.[7] ................................................ G02B 6/00
(52) U.S. Cl. ....................... 385/145; 385/141; 385/143; 385/144; 385/129
(58) Field of Search .................. 385/145, 141, 385/142, 143, 144, 129, 130, 131, 132

(56) References Cited

U.S. PATENT DOCUMENTS

| | | |
|---|---|---|
| 4,105,298 A | 8/1978 | Levine et al. |
| 4,838,634 A | 6/1989 | Bennion et al. |
| 5,046,800 A | 9/1991 | Blyer, Jr. et al. |
| 5,094,517 A | 3/1992 | Franke |
| 5,166,993 A | 11/1992 | Blyer, Jr. et al. |
| 5,462,880 A | 10/1995 | Kane et al. |
| 5,974,214 A | 10/1999 | Shacklette et al. |
| 6,086,999 A | 7/2000 | Ilvashenko |
| 6,087,000 A | 7/2000 | Girgis et al. |
| 6,100,371 A | 8/2000 | Suh et al. |
| 6,102,905 A | 8/2000 | Baxter et al. |
| 6,133,472 A | 10/2000 | Nalewajek et al. |
| 6,157,757 A | 12/2000 | Giaretta et al. |
| 6,226,429 B1 | 5/2001 | Hikita et al. |
| 6,229,949 B1 | 5/2001 | Ido et al. |
| 6,238,791 B1 | 5/2001 | Schell et al. |
| 6,245,412 B1 | 6/2001 | Choquette et al. |
| 6,306,563 B1 | 10/2001 | Xu et al. |
| 6,389,209 B1 * | 5/2002 | Suhir ......................... 385/129 |
| 6,418,261 B1 * | 7/2002 | Boek et al. ................. 385/129 |
| 2003/0026577 A1 * | 2/2003 | Gao et al. ................... 385/131 |
| 2003/0038251 A1 * | 2/2003 | Livesay et al. .......... 250/492.3 |
| 2003/0207215 A1 * | 11/2003 | Xu et al. .................... 430/321 |

OTHER PUBLICATIONS

N. Keil et al., "Athermal all–polymer arrayed–waveguide grating multiplexer", Electronics Letters, Apr. 26, 2001, vol. 37, No. 9.

N. Keil et al., "Athermal polarization–independent all–polymer arrayed waveguide grating (AWG) multidemultiplexer", Optical Society of America, 2000, pp. PD7–1 to PD7–3.

* cited by examiner

*Primary Examiner*—John D. Lee
*Assistant Examiner*—Sung Pak
(74) *Attorney, Agent, or Firm*—Joseph E. Maenner; Monte & McGraw, P.C.

(57) ABSTRACT

An optical waveguide is provided. The optical waveguide includes a polymer substrate and a lower cladding disposed on the substrate. The lower cladding is a first perhalogenated polymer. The optical waveguide also includes a core disposed on at least a portion of the lower cladding. A method of manufacturing the optical waveguide is also provided.

25 Claims, 1 Drawing Sheet

POLYMER OPTICAL WAVEGUIDES ON POLYMER SUBSTRATES

FIELD OF THE INVENTION

The present invention relates to polymer optical waveguides disposed on polymer substrates, and more specifically, to perfluorinated polymer optical waveguides.

BACKGROUND OF THE INVENTION

Optical waveguides can be formed in polymers by using a core polymer and a cladding polymer with the core polymer refractive index slightly higher than that of the cladding polymer in the near infrared region of the third optical telecommunication wavelength window (around 1550 nm). In order to form useful optical waveguide devices such as integrated splitters, couplers, arrayed waveguide gratings, and optical waveguide amplifiers, it is essential to have stable and low loss optical waveguides. The optical loss, or attenuation of an optical waveguide, originates primarily from two sources: 1) optical absorption by the core and cladding material and 2) optical signal scattering from the waveguide.

A general approach to making polymer optical waveguides is to dispose an undercladding polymer film layer on a silicon substrate and then a polymer core film layer on top of the undercladding layer. The polymer core layer film subsequently undergoes lithography and etching processes from which a rectangular cross-section channel is formed An overcladding polymer film layer is then disposed on top of the waveguide core and the exposed undercladding film layer.

It has been found that, during the processes of forming the undercladding, core and overcladding layers, such as spin coating and subsequent drying of solvents, temperature variations usually occur throughout the polymer waveguide layers. Such temperature variations cause polymer shrinkage or expansion in accordance with thermal expansion coefficients (CTE) of the polymer materials, which typically run between approximately 50 to 300 parts per million (ppm) per degree Celsius, depending on the particular polymer. Generally simultaneously, the waveguide substrate undergoes similar shrinkage or expansion as the temperature changes. However, in contrast to the CTE for polymers, the CTE for silicon is approximately 4.2 ppm per degree Celsius. The mismatch of CTE between the silicon substrate and the polymer waveguide claddings and core can cause polymer film cracking and stress build-up in the polymer layers. These effects will increase the polymer waveguide attenuation, preventing practical waveguide device application of polymer waveguides. This tendency can be further quantified through the following expression:

$$\sigma_f = E_f(CTE_f - CTE_s)(T_{proc} - T_{amb}) \quad \text{Equation 1}$$

where:

$\sigma_f$ is the stress in the film;
$E_f$ is the elastic modulus of the film;
$CTE_f$ is the CTE of the polymer film;
$CTE_s$ is the CTE of the substrate;
$T_{proc}$ is the processing temperature; and
$T_{amb}$ is the ambient temperature.

It is believed that polymers have been used as a substrate as well as the waveguide disposed on the substrate. Keil et al. have disclosed fluoroacrylate-type polymers such as pentafluorostyrene, trifluoroethylmethacrylate, and glycidylmethacrylate disposed on a polymer substrate. However, these fluoroacrylate-type polymers contain numerous CH bonds. Polymers with CH bonds typically have high absorption in the infrared region where the optical communication signals reside, at approximately 1.5 μm. This absorption causes optical communication signal loss. To alleviate the signal loss problem, CF bonds are used to substitute the CH bonds in the polymer. Perfluorinated polymers have no CH bonds, resulting in extremely low absorption loss around the 1.5 μm infrared communication wavelength.

It is desirable to have a low loss optical waveguide in which the coefficient of thermal expansion of both the substrate and the polymer layers disposed oil the substrate are such that the polymer layers do not crack or develop high stress on the substrate.

BRIEF SUMMARY OF THE INVENTION

Briefly, the present invention provides an optical waveguide. The optical waveguide comprises a polymer substrate and a lower cladding disposed on the substrate. The lower cladding is a first perhalogenated polymer. The optical waveguide also comprises a core disposed on at least a portion of the lower cladding.

Additionally, the present invention provides a method of manufacturing an optical waveguide. The method comprises providing a polymer substrate; depositing a first perhalogenated polymer onto the substrate; depositing a first polymer onto the first perhalogenated polymer; and depositing a second polymer onto the first polymer.

BRIEF DESCRIPTION OF THE DRAWINGS

The accompanying drawings, which are incorporated herein and constitute part of this specification, illustrate a presently preferred embodiment of the invention, and, together with the general description given above and the detailed description given below, serve to explain the features of the invention. In the drawings.

DETAILED DESCRIPTION OF THE INVENTION

Figure 1:
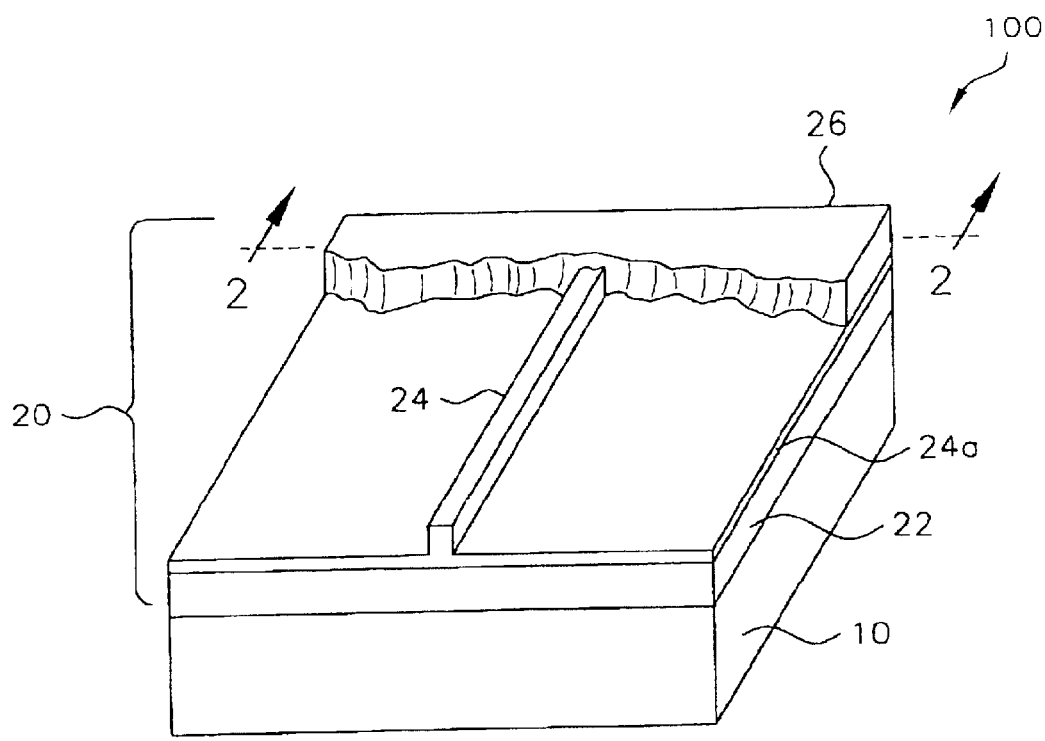
FIG. 1 is a perspective view of a polymer optical amplifier according to the present invention.

In the drawings, like numerals indicate like elements throughout. U.S. Pat. No. 6,603,917 B2, filed on even date, which is owned by the assignee of the present invention, is incorporated herein by reference in its entirety. As used herein, the term "element" is defined to mean ions, atoms, isotopes, and species of atoms of the Periodic Table.

Figure 2:
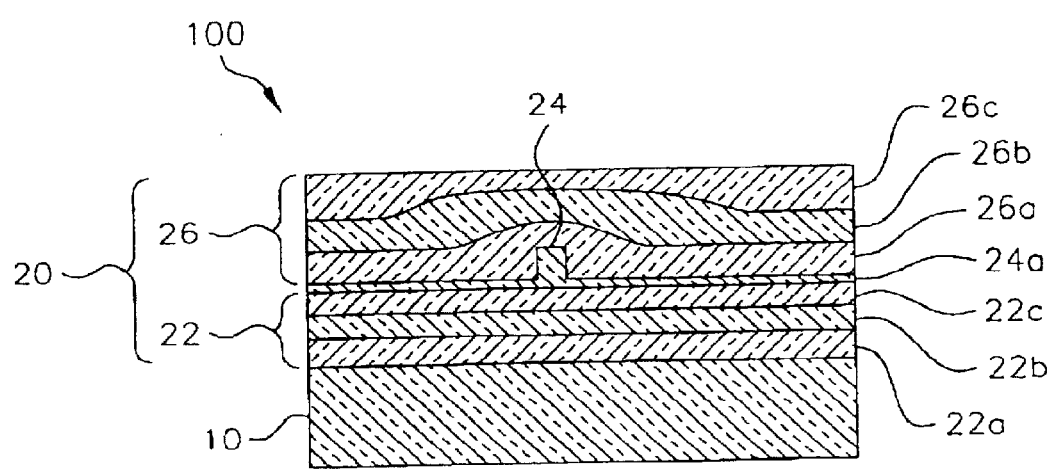
FIG. 2 is a cross-sectional view of the polymer optical amplifier taken along lines 2—2 of FIG. 1.

Referring to FIGS. 1 and 2, an optical waveguide assembly 100 is comprised of a polymer substrate 10 with a polymer optical waveguide 20 disposed on the substrate 10. The waveguide 20 is comprised of a lower cladding 22, a core 24 disposed on at least a portion of the lower cladding 22, and an upper cladding 26 disposed on the core 24 and a remaining portion of the lower cladding 22. Preferably, the lower cladding 22, the core 24, and the upper cladding 26 are all polymers, and more preferably, all perhalogenated polymers, and most preferably, perfluoropolymers.

Preferably, the substrate 10 is from the group consisting of polycarbonate, acrylic, polymethyl methacrylate, cellulosic, thermoplastic elastomer, ethylene butyl acrylate, ethylene vinyl alcohol, ethylene tetrafluoroethylene, fluorinated ethylene propylene, polyetherimide. polyethersulfone, polyetheretherketone, polyperfluoroalkoxyethylene, nylon, polybenzimidazole, polyester, polyethylene, polynorbornene, polyimide, polystyrene, polysulfone, polyvinyl chloride, polyvinylidene fluoride, ABS polymers, polyacrylonitrile butadiene styrene, acetal copolymer, poly[2,2-bistrifluoromethyl-4,5-difluoro-1,3-dioxole-co-tetrafluoroethylene] (sold under the trademark TEFLON® AF), poly[2,3-(perfluoroalkenyl)perfluorotetrahydrofuran] (sold under the trademark CYTOP®), poly[2,2,4-trifluoro-5-trifluoromethoxy-1,3-dioxole-co-tetrafluoroethylene] (sold under the trademark HYFLON®), and any other thermoplastic polymers; and thermoset polymers, such is diallyl phthalate, epoxy, furan, phenolic, thermoset polyester, polyurethane, and vinyl ester. However, those skilled in the art will recognize that a blend of at least two of the polymers listed above, or other polymers, can be used. It is also preferred that the substrate 10 has a CTE of approximately between 50 and 300 parts per million per degree Celsius. Preferably, the substrate 10 is generally circular and is approximately between 7.5 and 15 centimeters (3 and 6 inches) in diameter.

Preferably, the lower cladding 22 is a halogenated polymer, more preferably a fluoropolymer, and most preferably, a perfluoropolymer including a perfluoropolymer from the group consisting of TEFLON® AF, CYTOP®, and HYFLON®, although those skilled in the art will recognize that other polymers or polymer blends can be used for the lower cladding 22. It is also preferred that the lower cladding 22 has a CTE of approximately between 50 and 300 parts per million per degree Celsius. It is also preferred that the CTE of the substrate 10 and the CTE of the lower cladding 22 differ by less than approximately 40%. Such a difference greatly reduces thermal expansion differences between the substrate 10 and the lower cladding 22, minimizing the likelihood of developing cracks and stress in the lower cladding 22 during further manufacture of the waveguide assembly 100.

The core 24 is preferably a polymer, more preferably a halogenated polymer, and most preferably a perfluoropolymer. More preferably, for optical amplifier applications, the core 24 is constructed from a perfluoropolymer containing at least one rare earth element from the group consisting of lanthanum, cerium, praseodymium, neodymium, promethium, samarium, europium, gadolinium, terbium, dysprosium, holmium, erbium, thulium, ytterbium, and lutetium. Examples of preferred perfluoropolymers are disclosed in U.S. patent application Ser. Nos. 09/507,582, filed Feb. 18, 2000; 09/722,821, filed Nov. 28, 2000; and 09/722,282, filed Nov. 28, 2000, and 60/314,902, filed Aug. 24, 2001, which are all owned by the assignee of the present invention and are all incorporated herein by reference in their entireties. However, those skilled in the art will recognize that other polymers containing at least one rare earth element can also be used. Further, the core 24 can be a blend of polymers including at least a first polymer containing one of the rare earth elements disclosed above and at least a second polymer, such as the polymer used as the lower cladding 22.

The upper cladding 26 is preferably a polymer, more preferably a halogenated polymer, and most preferably a perfluoropolymer. More preferably, the upper cladding 26 is the same polymer or polymer blend as the lower cladding 22. However, those skilled in the art will recognize that the upper cladding 26 and the lower cladding 22 need not necessarily be the same polymer, although it is preferred that the upper cladding 26 have the same, or nearly the same, refractive index $n_{cl}$ as the lower cladding 22.

Preferably, the lower cladding 22 and the upper cladding 26 have a common refractive index $n_{cl}$ and the core 24 has a refractive index $n_{co}$ that differs from the refractive index $n_{cl}$ by a small enough amount such that the waveguide assembly 100 propagates a signal light $\lambda_S$ in a single mode. For the case where the cladding layers 22, 26 are homogeneous, with a single refractive index $n_{cl}$, the relationship between dimensions of the core 24 and $\Delta n$ ($n_{co}-n_{cl}$) is well-captured by the dimensionless V parameter, defined by:

$$V = \frac{2\pi}{\lambda} a\sqrt{\Delta n} \qquad \text{Equation 2}$$

where $\lambda$ is the wavelength, preferably in nanometers, of light to be transmitted through the core 24 and $\alpha$ is the width of the core 24, also preferably in nanometers. The V parameter must be less than 2.5 in order to achieve the single-mode condition. When $\Delta n$ is large, $\alpha$ must be kept small to achieve V<2.5. Such a requirement may result in low optical efficiency coupling to an optical fiber, resulting in undesired signal loss. For a V of 2.5, with $\Delta n$ of approximately 0.04, at a wavelength $\lambda$ of 1550 nanometers, $\alpha$ is approximately 3000 nanometers, or 3 microns.

Preferably, the waveguide assembly 100 is adapted to amplify light for use in an optical amplifier, although those skilled in the art will recognize that the waveguide assembly 100 can be an optical splitter, an optical combiner, or other optical components that can be constructed from a waveguide. For such non-amplification uses, the core 24 need not contain the rare earth element as described above.

To manufacture the waveguide assembly 100, the substrate 10 is first prepared. The surface of the substrate 10 is cleaned to remove any adhesive residue which may be present on the surface of the substrate 10. Typically, a substrate is cast or injection molded, providing a relatively smooth surface on which it can be difficult to deposit a perfluoropolymer, owing to the non-adhesive characteristics of perfluoropolymers in general. After cleaning, the substrate 10 is prepared to provide better adhesion of the lower cladding 22 to the surface of the substrate 10. The substrate 10 can be prepared by roughening the surface or by changing the chemical properties of the surface to better retain the perfluoropolymer comprising the lower cladding layer 22. The preferred roughening method is to perform reactive ion etching (RIE) using argon. The argon physically deforms the surface of the substrate 10, generating a desired roughness of approximately 50 to 100 nanometers in depth. The preferred method that changes the chemical properties of the surface of the substrate 10 is to perform RIE using oxygen. The oxygen combines with the polymer comprising the surface of the substrate 10, causing a chemical reaction on the surface of the substrate 10 and oxygenating the surface of the substrate 10. The oxygenation of the substrate 10 allows the molecules of the perfluoropolymer comprising the lower cladding 22 to bond with the substrate 10. Although RIE with argon and oxygen is disclosed, those skilled in the art will recognize that other methods can be used to prepare the substrate 10. Alternatively, the substrate 10 can be prepared by applying a fluorinated coupling agent, such as a fluorosilane, to the substrate 10.

The lower cladding 22 is then deposited onto the substrate 10. For a lower cladding 22 constructed from HYFLON® solid HYFLON® is dissolved in a solvent, perfluoro(2-butyltetrahydrofuran), which is sold under the trademark FC-75, as well as perfluoroalkylamine, which is sold under the trademark FC-40. Other potential solvents are a perfluolinated polyether, such as that sold tinder the trademark H GALDEN® series HT170, or a hydrofluoropolyether, such as that sold under the trademarks H GALDEN® series ZT180 and ZT130. For a lower cladding 22 constructed from other polymers, each polymer is dissolved in a suitable solvent to form a polymer solution. The polymer solution is then spin-coated onto the substrate 10 using known spin-coating techniques. The substrate 10 and the lower cladding 22 are then heated to evaporate the solvent from the solution.

Preferably, the lower cladding 22 is spincoated in layers, such that a first layer 22a is applied to the substrate 10 and annealed to evaporate the solvent, a second layer 22b is applied to the first layer 22a and annealed, and a third layer 22c is applied to the second layer 22b and annealed. Preferably, after all of the layers 22a, 22b, 22c are applied, the lower cladding 22 has achieved a height of between 8 and 12 micrometers. Although the application of three layers 22a, 22b, 22c are described, those skilled in the art will recognize that more or less than three layers 22a, 22b, 22c can be used.

Since adhesion of the lower cladding 22 to the substrate 10 can be poor due to the non-adhesiveness of the perfluoropolymer used as the lower cladding 22, adhesion testing was performed to determine the adhesion of the lower cladding 22 to the substrate 10. The testing was performed with several substrates; first, with a substrate that had not been cleaned or prepared prior to applying the lower cladding 22, second, with a substrate that had been cleaned but not prepared prior to applying the lower cladding 22, and third, with a substrate that had been both cleaned and prepared prior to applying the lower cladding 22. For the prepared substrate, the preparation consisted of performing RIE with oxygen. The test consisted of taking a cross hatch cutter with four cutting edges and cutting through the lower cladding 22 and just into each substrate 10, forming a first series of cuts. The cross hatch cutter was then taken at right angles to the first series of cuts to make a second series of cuts, forming a lattice pattern. The lower cladding 22 was brushed lightly to remove any loose flakes of lower cladding 22. Tape with an adhesive strength of approximately 12.3 Newtons/25 mm (45.0 oz/in) was applied to the lattice pattern and removed. The lower cladding 22 on each substrate 10 was then viewed under a microscope.

Table I, below, provides results of the adhesion tests, which show that preparing the substrate 10 prior to depositing the lower cladding layer 20 virtually eliminated flaking of the lower cladding 22 from the surface of the substrate 10.

TABLE I

| Substrate | ISO Value |
| --- | --- |
| Uncleaned and unprepared | 5 |
| Cleaned and unprepared | 5 |
| Cleaned and prepared | 0 |

An ISO value of 5 generally corresponds to any degree of flaking that exceeds 65% of the affected area after cross-cutting and an ISO value of 0 generally corresponds to the edges of the cross-cuts being completely smooth and none of the squares of the lattice being detached.

After the lower cladding 22 has dried, the rare earth containing core 24 is deposited onto the lower cladding 22, preferably using the same technique as described above to deposit the lower cladding 22 onto the substrate 10. However, instead of depositing several sub-layers of the core 24 onto the lower cladding 22, preferably, only one layer of the core 24 is deposited onto the lower cladding 22. Preferably, the core 24 is soluble in a solvent in which the lower cladding 22 is not soluble so that the solvent does not penetrate the lower cladding 22 and disturb the lower cladding 22. For a core 24 constructed from CYTOP®, solid CYTOP® is dissolved in a solvent, such as perfluorotrialkylamine, which is sold under the trademark CT-SOLV 180™, or any other solvent that readily dissolves CYTOP®, forming a CYTOP® solution. Alternatively, CYTOP® can be commercially obtained already in solution. For a waveguide 100 that will be used as an optical amplifier, the rare earth containing perfluoropolymer is then blended with the CYTOP® solution and the combined rare earth containing perfluoropolymer/CYTOP® solution is applied over the lower cladding 22. After the core 24 is dried, a preferred thickness of the core 24 and lower cladding 22 is approximately between 12 and 16 microns.

Next, the core 24 is etched to provide a desired core shape. Preferably, the etching is performed by RIE, which is well known in the art. However, those skilled in the art will also recognize that other methods of etching the core 24 may also be used. While FIG. 1 discloses a generally straight core 24, those skilled in the art will recognize that other shapes can be used, such as the curved waveguide shape disclosed in U.S. patent application Ser. No. 09/877,871, filed Jun. 8, 2001, which is owned by the assignee of the present invention and which is incorporated herein by reference in its entirety. Further, while FIG. 2 discloses a generally rectangular cross section for the core 24, those skilled in the art will recognize that the cross section of the core 24 can be other shapes as well Preferably, the core 24 is not etched completely down to the lower cladding 22, but a core layer 24a of core material is retained for manufacturing purposes as will be described later herein.

Next, the upper cladding 26 is deposited onto the core 24, the core layer 24a, and any remaining portion of the lower cladding 22 not covered by the core 24 or the core layer 24a. Preferably, similar to the lower cladding 22, the upper cladding 26 is spincoated in layers, such that a first layer 26a is applied to the core 24 and a remaining portion of the lower cladding layer 22 not covered by the core 24 and annealed to evaporate the solvent, a second layer 26b is applied to the first layer 26a and annealed, and a third layer 26c is applied to the second layer 26b and annealed. Preferably, the upper cladding 26 is soluble in a solvent in which the core 24 and core layer 24a are not soluble so that the solvent does not penetrate the core 24 and the core layer 24a and disturb the core 24 or the core layer 24a. The core layer 24a provides a barrier between the upper cladding 26 and the lower cladding 22, so that, since the upper cladding 26 and the lower cladding 22 are preferably the same material, the solvent in which the upper cladding 26 is applied does not penetrate to the lower cladding 22. Preferably, after all of the layers 26a, 26b, 26c are applied, the entire waveguide 100 has achieved a height of between 15 and up to approximately 50 micrometers. Although the application of three layers 26a, 26b, 26c are described, those skilled in the art will recognize that more or less than three layers 26a, 26b, 26c can be used. Alternatively, the upper cladding 26 can be a different material fiom the lower cladding 22, but with approximately the same refractive index as the lower cladding 22, for example, a photocuring fluorinated acrylate or a thermoset.

As can be seen in FIG. 2, the layers 26a, 26b, 26c are not necessarily flat, but contour around the core 24 with decreasing curvature for each successive layer 26b, 26c. Although the last layer 26c is shown with a generally flat top surface, those skilled in the art will recognize that the top surface of the last layer 26c need not necessarily be flat. Those skilled in the art will also recognize that single layer claddings with high degrees of flatness or planarization can be achieved by either spincoating or casting processes.

After forming the waveguide 100, the waveguide 100 is cut to a desired size and shape, preferably by dicing. As shown in FIG. 1, a desired shape is generally rectangular, although those skilled in the art will recognize that the waveguide 100 can be cut to other shapes as well.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

What is claimed is:

1. An optical waveguide comprising:
   a polymer substrate having a first coefficient of thermal expansion; a lower cladding disposed on the substrate, the lower cladding being a first perhalogenated polymer and having a second coefficient of thermal expansion differing from the first coefficient of thermal expansion by less than approximately 40%; and
   a polymer core disposed on at least a portion of the lower cladding.

2. The optical waveguide according to claim 1, wherein the core is a second perhalogenated polymer.

3. The optical waveguide according to claim 2, wherein at least one of the lower cladding and the core is a perhalogenated polymer.

4. The optical waveguide according to claim 1, further comprising an upper cladding disposed on the core and a remaining portion of the lower cladding.

5. The optical waveguide according to claim 1, wherein the first coefficient of thermal expansion is between 50 and 300 parts per million per degree Celsius.

6. The optical waveguide according to claim 5, wherein the second coefficient of thermal expansion is between 50 and 300 parts per million per degree Celsius.

7. The optical waveguide according to claim 1, wherein the polymer substrate is from the group consisting of polycarbonate, acrylic, polymethyl methacrylate, cellulosic, thermoplastic elastomer, ethylene butyl acrylate, ethylene vinyl alcohol, ethylene tetrafluoroethylene, fluorinated ethylene propylene, polyetherimide, polyethersulfone, polyetheretherketone, polyperfluoroalkoxyethylene, nylon, polybenzimidazole, polyester, polyethylene, polynorbornene, polyimide, polystyrene, polysulfone, polyvinyl chloride, polyvinylidene fluoride, ABS polymers, polyacrylonitrile butadiene styrene, acetal copolymer, poly[2,2-bistrifluoromethyl-4,5-difluoro-1,3-dioxole-co-tetrafluoroethylene], poly[2,3-(perfluoroalkenyl) perfluorotetrahydrofuran], poly[2,2,4-trifluoro-5-trifluoromethoxy-1,3-dioxole-co-tetrafluoroethylene], and any other thermoplastic polymers; and thermoset polymers, such as diallyl phthalate, epoxy, furan, phenolic, thermoset polyester, polyurethane, and vinyl ester.

8. The optical waveguide according to claim 7, wherein the polymer substrate is a blend of at least two of the polymers from the group.

9. The optical waveguide according to claim 1, wherein the lower cladding is from the group consisting of poly[2,3-(perfluoroalkenyl) perfluorotetrahydrofuran], poly[2,2,4-trifluoro-5-trifluoromethoxy-1,3-dioxole-co-tetrafluoroethylene], and poly[2,2-bistrifluoromethyl-4,5-difluoro-1,3-dioxole-co-tetrafluoroethylene].

10. The optical waveguide according to claim 1, wherein the lower cladding is a blend of at least a first polymer and a second polymer.

11. The optical waveguide according to claim 1, wherein the core transmits single-mode light.

12. The optical waveguide according to claim 1, wherein the core contains a rare earth element.

13. The optical waveguide according to claim 1, wherein the substrate has a roughened surface.

14. The optical waveguide according to claim 13, wherein the roughened surface is approximately 50 to 100 nanometers deep.

15. The optical waveguide according to claim 1, wherein the substrate has an oxygenated surface.

16. The optical waveguide according to claim 1, wherein the optical waveguide is adapted to amplify light.

17. A method of manufacturing an optical waveguide comprising:
   providing a polymer substrate having a first coefficient of thermal expansion;
   depositing a first perhalogenated polymer onto the substrate, wherein the first perhalogenated polymer has a second coefficient of thermal expansion differing from the first coefficient of thermal expansion by less than approximately 40%;
   depositing a first polymer onto the first perhalogenated polymer; and
   depositing a second polymer onto the first polymer.

18. The method according to claim 17, wherein depositing the second polymer comprises depositing the first perhalogenated polymer.

19. The method according to claim 17, wherein depositing the first polymer comprises depositing a rare earth containing perhalogenated polymer.

20. The method according to claim 17, wherein depositing the first perhalogenated polymer onto the substrate comprises:
   dissolving a first perhalogenated polymer in a solvent, forming a first solution;
   spincoating the first solution onto the substrate; and
   evaporating the solvent from the first solution.

21. The method according to claim 17, further comprising, prior to depositing the first perhalogenated polymer onto the substrate, preparing the substrate.

22. The method according to claim 21, further comprising, prior to preparing the substrate, cleaning the substrate.

23. The method according to claim 21, wherein preparing the substrate comprises roughening the substrate.

24. The method according to claim 21, wherein preparing the substrate comprises oxygenating the substrate.

25. The method according to claim 21, wherein preparing the substrate comprises applying a fluorinated coupling agent to the substrate.

* * * * *